(12) United States Patent
Chaar et al.

(10) Patent No.: US 7,480,288 B2
(45) Date of Patent: Jan. 20, 2009

(54) METHOD FOR SUPPORTING CONCURRENT COMMUNICATION OVER MULTIPLE ACCESS POINTS AND PHYSICAL MEDIA

(75) Inventors: Jarir K. Chaar, Tarrytown, NY (US); Dimitri Kanevsky, Ossining, NY (US); Ran D. Zilca, Briarcliff Manor, NY (US); Alexander Zlatsin, Yorktown Heights, NY (US)

(73) Assignee: International Business Machines Corportion, Armonk, NY (US)

( * ) Notice: Subject to any disclaimer, the term of this patent is extended or adjusted under 35 U.S.C. 154(b) by 977 days.

(21) Appl. No.: 10/950,031

(22) Filed: Sep. 24, 2004

(65) Prior Publication Data

US 2006/0067297 A1    Mar. 30, 2006

(51) Int. Cl.
*H04L 12/66* (2006.01)

(52) U.S. Cl. .................. 370/352; 370/395.5; 709/238

(58) Field of Classification Search ................. 370/352, 370/395.5
See application file for complete search history.

(56) References Cited

U.S. PATENT DOCUMENTS

| 6,643,292 | B2* | 11/2003 | Chapman et al. | 370/395.52 |
|---|---|---|---|---|
| 7,046,989 | B2* | 5/2006 | Karaoguz et al. | 455/408 |
| 7,051,083 | B1* | 5/2006 | Graf et al. | 709/218 |
| 7,305,474 | B2* | 12/2007 | Giaffreda et al. | 709/227 |
| 7,346,025 | B2* | 3/2008 | Bryson | 370/328 |
| 2001/0012288 | A1* | 8/2001 | Yu | 370/352 |
| 2005/0105552 | A1* | 5/2005 | Osterling | 370/466 |

* cited by examiner

*Primary Examiner*—Creighton H Smith
(74) *Attorney, Agent, or Firm*—Scully, Scott, Murphy & Presser, P.C.; Daniel P. Morris, Esq.

(57) ABSTRACT

A method for enabling communication concurrently over multiple access points and multiple physical media including but not limited to: cellular, network (e.g., Ethernet), broadband wireless, audio communication schemes.

1 Claim, 4 Drawing Sheets

METHOD FOR SUPPORTING CONCURRENT COMMUNICATION OVER MULTIPLE ACCESS POINTS AND PHYSICAL MEDIA

BACKGROUND OF THE INVENTION

1. Field of the Invention

This invention relates generally to the field of computer communication, including data, voice, and video communications, and peer-to-peer communications; and, particularly, to novel features for simultaneously communicating over multiple access points and physical media.

2. Description of the Prior Art

Many computing devices currently have more than a single network access (NA) point installed. For example, a desktop PC may have an Ethernet port, a telephony modem, an audio connection, and a wireless LAN connection. A Personal Digital Assistant (PDA) may have infra red, cellular, and Ethernet connections. Currently each of these network interfaces may only be used separately in a single communications session.

By way of the following illustrative examples, potential problems may result when applications or systems that rely upon use of a single network media for communications, are rendered inoperable. In a first example, a communications system has been set-up whereby a hearing-impaired person uses a critical application like a stenographic transcription over Internet. In this example, a stenographer acts as an interpreter and transcribes a meeting for the hearing-impaired user. In a second example, a doctor performs a surgical procedure remotely using a robot that is controlled by communicating commands via the Internet. Even a temporary stoppage of these applications can seriously affect a process, i.e., a hearing-impaired user (in the first example) will be unable to follow the meeting or, the doctor (in the second example) unable to perform the operation. The likelihood of such interruption is more probable if only one media is used for conducting these processes over the Internet.

In a third example, a communications system utilizing a single network has been set-up in a building for emergencies. If there is a fire in a building and the single network is broken, it is possible that computers may not quickly transmit important information to an external backup server or, it is possible that emergency messages cannot be transmitted to all people in the building about the need to evacuate. Similarly, people who may be stuck in a building that is burning or destroyed by an earthquake, for example, and are trying to call or send messages about their situation may be unable to do so if the major communication media network for their devices is impaired or destroyed.

It would be highly desirable to provide a method, system and computer program product that enables a single computing device to communicate concurrently using multiple network access (NA) points for a single communications session.

SUMMARY OF THE INVENTION

It is thus an object of the present invention to provide computing devices functionality for concurrently utilizing multiple network access (NA) points for a single communications session and, particularly, a method for enabling the concurrent use of multiple NA points for a single communications session.

According to the invention, all multiple NA points are encapsulated into a single generalized network interface, installed both at the receiver and transmitter ends. In practice, this is accomplished using a software layer that allows programmers and users to send and receive messages without specifying which NA point to use. A policy will be specified to dictate how to combine the use of the different available NA's (the communication "mode"). For example, a simple policy can be: "use only the Ethernet port" or "when both wireless and Ethernet are available use Ethernet", etc. More complicated policies will allow trading off and enhancing security, reliability, and availability of the desired communication. Finally, the invention permits the introduction of different services using policies that optimize the use of the different NA's based on criteria such as speed, latency, BER (Bit Error Rate), dollar cost, etc.

In accordance with the present invention, there is provided a method for enabling concurrent use of multiple network access (NA) points for a single communications session, each of the multiple NA points being encapsulated into a single network interface, wherein the single network interface implemented at both a receiver device and a transmitter device transmits and receives data respectively via at least one communications media, such that a communication policy is implemented to specify how to combine the use of the different available NA points via said single network interface and wherein, messages may be sent and received without specifying which NA point to use.

BRIEF DESCRIPTION OF THE DRAWINGS

Further features, aspects and advantages of the structures and methods of the present invention will become better understood with regard to the following description, appended claims, and accompanying drawings where:

DETAILED DESCRIPTION OF THE PREFERRED EMBODIMENTS

Figure 1:
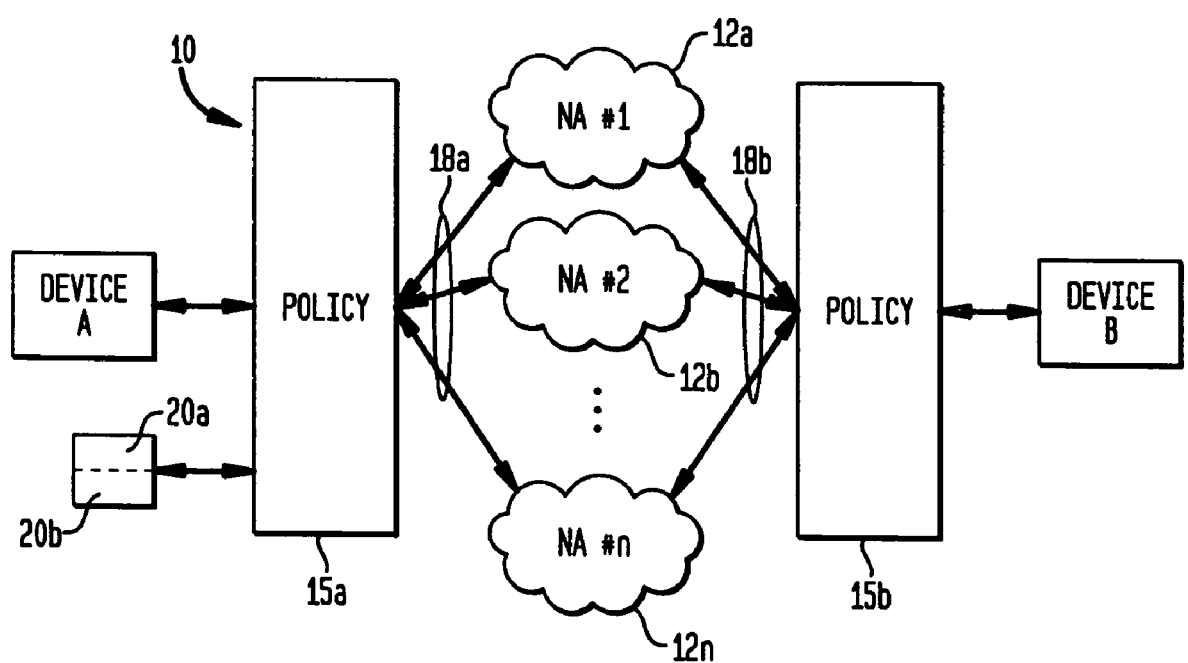
FIG. 1 illustrates a high level block diagram of a communication system implementing various aspects of the invention.

FIG. 1 depicts a block diagram showing the different components comprising the system 10 for utilizing multiple network access (NA) points for a single communications session according to the invention. Particularly, as shown in FIG. 1, the system 10 of the invention encapsulates available multiple communication networks 12a, 12b, . . . , 12n into a single "network" interface that can be used by a computing device such as a personal computer, PDA, etc. This single network allows for two end-user devices-device A and device B, each having one of more network access points, to communicate. The device A and device B each interface with the multiple communication networks 12a, 12b, . . . , 12n through a single point of entry, represented in FIG. 1 as a policy 15a, 15b, respectively. Since both devices use the same policy, device A knows how to recombine packets received via the multiple networks 12a, 12b, . . . , 12n from device B, and vice versa, i.e., device B knows how to recombine packets sent to it via the multiple networks from device A.

Devices A, B may communicate with other computers or networks of computers, for example via communications channels 18, e.g., modem, cable, or other wired media, or may communicate over a wireless network using a wireless media through an interface. Thus for example, a network 12 may comprise a local area network (LAN) or a wide area network (WAN), or can be a client in a client/server arrangement with another computer, etc. All of these configurations, as well as the appropriate communications hardware and software, are known in the art. Further, the devices A, B may connect to a wireless network using a networking protocol such as the Transmission Control Protocol/Internet Protocol ("TCP/IP") or like IP protocol, over a number of alternative connection media, such as cellular phone, radio frequency links, e.g., Bluetooth, radio frequency networks, satellite networks, etc. The devices A, B may connect to a network via TCP or UDP (User Datagram Protocol) over IP, X.25, Frame Relay, ISDN (Integrated Services Digital Network), PSTN (Public Switched Telephone Network), etc.

In accordance with the invention, a user of device A, via a selected policy 15a, may implement multiple network media and, via a switching mechanism, enable switching from a primary media to a different media if the primary media is terminated or rendered inoperable. For example, referring back to the example described, if a user receives a stenographic transcription over a wired network and it is frozen because of Internet problems, then the automatic switching mechanism may be activated to switch the wired network connection to a cellular modem connection so that the hearing-impaired end user will continue to get the transcription over cellular network through the cellular modem.

Referring to FIG. 1, in a particular example communication media such as the Internet, represented by communications network 12a, messages are communicated as packets that are transmitted from a transmitter node, e.g., device A, to a receiver node, e.g., device B. For any given message that needs to be sent through the network, any device may serve as a transmitter node—emitting packets into the network destined for a particular receiver node. The receiver node includes a receiving device that accepts messages embedded in packets from the network. The receiver node may alternately comprise a transceiver device that first receives packets and then relays them to a second receiver node (not shown). A transceiver node is merely a particular case of a network node that performs receiving followed by transmitting functions.

According to the invention, the set of rules that specify how to break down the message into packets, and which subset of NA's to use for every individual packet is referred to as the "policy" 15a, 15b. The policy may be viewed as a "shared secret" between the transmitter node (e.g., Device A) and the receiving node (e.g., Device B). A receiver node cannot correctly recombine the message sent to it by a transmitter node without knowledge of the policy. Thus, referring to communications system 10 of FIG. 1, both Devices A, B include several Network Access (NA) points. As a message to be communicated is broken into packets, in one embodiment, device A may choose to use different NA's for different packets of the same message according to one selected policy 15a. Implementing an alternative policy, each packet of a message may be transmitted using several NA's in a redundant manner. The receiver node, device B, requires knowledge of the policy to determine how the message was broken down into packets in order to reconstruct the message and to determine which NA's were used for every packet in order to listen on the correct NA's and extract the correct individual packets. In operation, the policy is programmed separately at both the receiver and transmitter ends. A receiver identifies a packet sent with an unknown policy and will throw an error message.

As further shown in FIG. 1, a policy 15a to be implemented at a message transmitting device may be determined according to current information available such as user profile information, the sensed conditions of the environment and/or, user biometric information. For instance, a memory storage device 20a associated with Device A (a computer) may include user profile information 20a, including, for instance, a user calendar. When referring to this calendar, or, for example, based on a user profile history, the computing device A may determine that a message to be sent is urgent and thus may implement a policy to send that data via the fastest available media if it's urgent. Alternatively, the policy may be determined based on sensed environmental condition, or based on sensed or perceived biometrics data 20b. For example, a user's pulse or heart rate may be sensed and determined that the user is in an excited or rushed state. Accordingly, a message may be sent via the fastest route.

Examples of possible policy types that may be implemented according to the invention are now described:

A first policy type includes a Security oriented policy that is useful for reducing the likelihood of eavesdropping and compromising secure transmitted information. Thus, a security oriented policy includes the software implemented at the receiver for multiplexing packets over different NA's; for example, breaking a message into several packet streams and transmitting each stream through a different NA.

The implementation of such a security oriented policy is now described with respect to an example scenario corresponding to a "Man In The Middle (MITM) attack" on a system that utilizes the security oriented policy of the invention. In order to carry out a successful MITM attack, a third party attempting to monitor the communication channel must implement the following: 1) a tapping device/equipment for all the media used; 2) a device that knows the composition/de-composition scheme, in order to reassemble packets. This scheme is the policy, and may be governed by a shared secret. Thus, for example, a policy may employ a "media hopping" technique that is analogous to frequency hopping communications technique used in RF/data communications. In the media hopping technique employed in a security policy, every consecutive packet or groups of packets are transmitted through a different NA, and the sequence of NA's is a shared secret.

A second policy type includes a Reliable communication policy that exploits the different physical properties of different NA's and is useful for reducing errors that may be caused in message transmission over a single channel. That is, according to the Reliable communication policy, errors that are caused by different channels (due to communication of messages over different NA's) will be statistically independent. This is because the physical phenomena that cause the channel errors vary significantly across channels. For example, channel fading effects caused by a transmission from a moving vehicle in a cellular network, such as network 12b in FIG. 1, may effect a cellular channel significantly, but not a radio frequency transmission over a communications network 12n in FIG. 1, that uses a much lower frequency range. An electrical noise resulting from proximity to high voltage lines may effect any electromagnetic transmission, but will not interfere with an audio transmission. Therefore, if the same critical packets are transmitted through different media, the consistency of the packet content across the different channels indicates that it is error free. In addition, voting schemes across channels may be deployed to correct errors. This is a new form of introducing redundancy, similar to the way convolutional/turbo codes introduce redundancy by adding bits into packets. A reliable communication policy may therefore consist of transmitting all data through all available NA's. The security level is lower since the policy is trivial, however the communication reliability is extremely high, exploiting the different physical properties of the different NA's.

A third policy type includes a High availability policy that exploits communication systems providing continuous network connectivity. For example, some mobile applications require a continuous connection to a network. Thus, a location-aware application may include a local Global Positioning System (GPS) system installed on the mobile device, that monitors the device's location and continuously transmits the location to a control center. Since this kind of an application should always be up and connected, the location information may be transmitted through all of the available media NAs/channels. An availability oriented policy may therefore include devices that continuously sense available NA's, and transmit messages through all channels. A receiver, receiving communications in accordance with such a High availability policy, possesses knowledge of how to ignore the redundancy in case more than one NA is connected. This is similar to a high reliability policy, except for the fact that the transmitting mode is not expected to be in an area that is covered by all NA's, and a single NA covering the node will be sufficient.

A fourth policy type includes an On demand services/Quality of service policy. A network/content provider that operates a multi-channel network may use the system of the invention to provide on demand communication and charge customers based on Quality Of Service (QOS). The content provider may offer users different policies to choose from with each policy optimizing a different objective function—including, but not limited to the following: "cheapest communication", "fastest communication", "latency free communication", "lowers Bit Error Rate (BER) communication", etc. The transmitting device includes a device that will first negotiate with the different NA's and come up with the best combination scheme (i.e., a Best policy) for the requested communication session. For example, a user that would like to establish a voice call from his device may ask for the cheapest current connection that allows for full duplex low latency (but also low speed) connection. The device will query all the available NA's and will come up with a scheme that uses a public wireless LAN that is currently cheaper (e.g., because it is on a weekend day) combined with high BER cellular channel that is also available. The same use may ask to established a video-on-demand session, and therefore a different policy will be used, with the policy implementing the least expensive reliable fast downlink with potentially a slow unreliable (but lest costly) uplink, for example.

Figure 2:
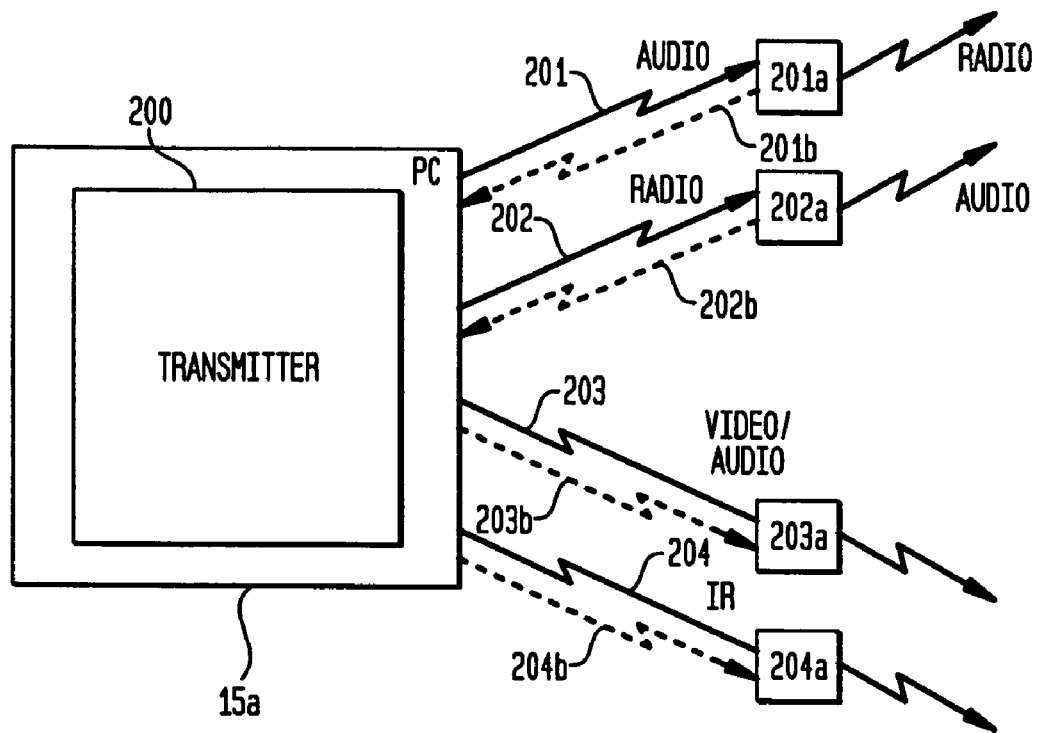
FIG. 2 shows a block diagram of emergency back up using the invention.

FIG. 2 depicts an example transmitter node (e.g., provided in a computing device such as a personal computer). The transmitter shown in FIG. 2 comprises multiple access points enabling communications over different communications media, for example, audio, video, monitor radiation, Infrared (IR), etc. in accordance with a specific policy. For example, in an office building, a policy may be implemented for transmitting important data for backup in an emergency situation, e.g., a burning office building. Thus, the different media can be used as a path consisting of communication channels for transmitting the important data, for example, for backup in an emergency situation. As depicted in FIG. 2, the data may be transmitted through many paths as packets and according to a policy depicted, may be transmitted through all available media.

As further shown in the embodiment depicted in FIG. 2, a plurality of nodes $201a, \ldots, 204a$ are provided that represent the different network media. For example, $201a$ may represent a microphone for receiving audio data, $202a$ may comprise a radio transceiver, e.g., for receiving. Bluetooth radio transmission, $204a,$ may comprise an IR transceiver, etc. That is any type of available communications media is represented as nodes $201a, \ldots, 204a$. In the case of audio, a computer device may include an encoding means to encode data in a voice (audio) medium (e.g. via a modulation). Thus, the computer may encode some data as audio data and use speakers to communicate this data to microphones that can be located either in the building, outside the building, or in cars/mobiles that may be specially equipped with sensors to receive such audio information. In one embodiment, the audio information can be embedded in carrier frequencies that are not heard by a person in order to not affect peoples' hearing.

Referring to the use of automobiles, it is understood that automobiles/mobiles are now equipped to function as a valid source and destination of communication. However, as automobiles suffer communication problems due to both being mobile and moving fast (e.g., RF channel fading), they need more reliable/available communication. Furthermore, as an automobile may exhibit several emergency situations (e.g., breakdown, accident), the prioritizing properties described herein would be extremely beneficial as they are equipped with multiple NA's such as radio, satellite, etc.

In another embodiment, different computers in the same location may communicate information via audio at the same time (e.g., choosing different frequencies or time intervals for broadcasting). Similarly, using images on screens and cameras in a building one can communicate encoded video data in an emergency situation. For example, in a further embodiment, an available media, i.e., a communication channel, may comprise a CRT and special sensor devices that monitor emitted radiation and which may be located both inside and outside building. As shown in FIG. 2, these nodes $201a, \ldots, 204a$ may further include conversion mechanisms for converting transmission received via one media into a communication via another available media. For example, node $201a$ may comprise a microphone that picks-up a received audio data (e.g., voice) transmission and converts it to a radio frequency communication including modulated audio data. Alternately, nodes $201a, \ldots, 204a$ may represent a router or switch that is capable of selecting different media based on current network load, or based on security requirements.

As further depicted in FIG. 2, packets transmitted through the different paths and received at the nodes $201a, \ldots, 204a$ send back to the originating transmitter acknowledgment information $201b, \ldots, 204b$, respectively, to inform whether the packets will be received at the respective destination points and via what kind of media. This information may be used by backup services to reduce number of duplications of these packets and initiate continued transmission of packets only in the kind of media that is reliable (i.e., is not destroyed by a fire in the burning office building scenario, for example).

In a further embodiment, the data in a computer is prioritized. For example, very important data (e.g., text files or notes that have just recently been created) can be encoded in voice. If computers receive information from smoke/heat sensors detecting an emergency situation (e.g., a fire) and the standard communications network at the building has failed, then speakers in the transmitting PC may generate audio data with encoded messages. These messages can be either repeated again and again or, voice communication can be established between computers and external backup devices that confirm receiving the data (this assumes that computers have also microphones that capable to receive external sounds). In a similar operation, other channels may be considered for communication. Additionally, computers with broken network communication channels inside the building can communicate with other computers in the same room whose network communication channels are working.

In a particular example shown in FIG. 2, where the system includes a main transmitter device 200 operating with the personal computer, in a burning office building scenario, a high availability policy 15a would be implemented that would enable the transmitting device 200 to transmit all its data for emergency back-up. Communication links depicted by arrows 201, 202, 203, 204 represent the communication channels comprising various different communication media. For example, path 201 corresponds to an audio channel, path 202 corresponds to a radio channel, path 203 corresponds to an audio channel, and path 204 corresponds to an IR communications channel. As depicted in FIG. 2, nodes 201a, 202a, 203a, 204a are transmitter devices that convert received data into packets according to the policy for transmission according to the chosen media type. Communication links depicted by arrows 201b, 202b, 203b, 204b are acknowledgement messages that are sent as packets back to the main transmitter 200 to indicate that the data packets have been successfully passed via the corresponding paths.

Figure 3:
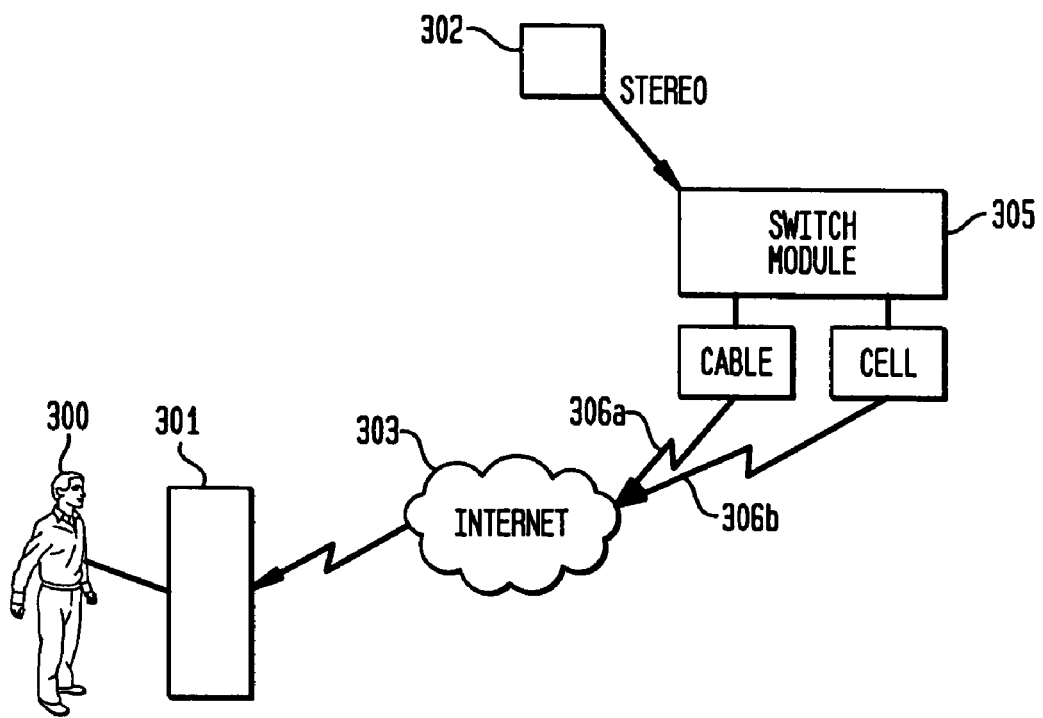
FIG. 3 depicts an example scenario of a stenographic interpretation service over Internet using the invention.

FIG. 3 depicts an example scenario described wherein a user 300 receives a transcription from a stenographer, for example, via a network connection such as the Internet 303. Block 301 is a computer device that receives the transcription over the Internet 303 via a cable communications channel 306a, for example. As shown in FIG. 3, the stenographer 302 provides a transcription for communication over the Internet 303 via the wired (cable) communications media 306a. A computer device 302 implemented by the stenographer includes a switching node 305 that switches to a wireless connection 306b, a cellular phone wireless media connection, for example, if the prime Internet connection 306a is interrupted or rendered inoperable. Similarly, any kind of remote transcription service (for example, via automatic speech recognition) that are performed over the Internet may implement a switching policy to enable routing of signals via the different media.

Figure 4:
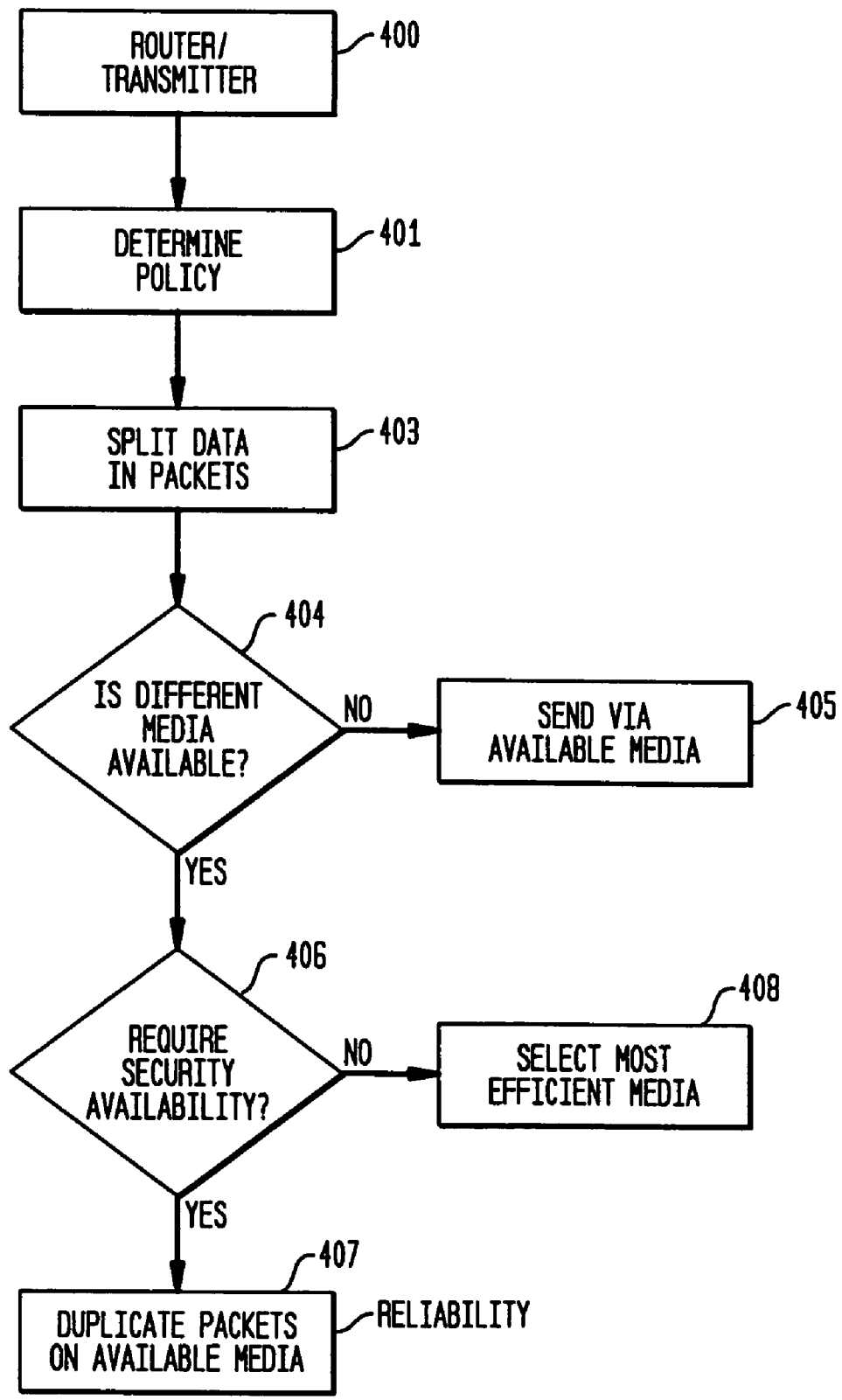
FIG. 4 depicts the methodology employed at the transmitter device for communicating according to the present invention; and, FIG. 5 depicts the methodology employed at the receiver device for communicating according to the invention.

FIG. 4 depicts a communication methodology 400 implemented at the router/transmitter according to one aspect of the invention. As shown in a first step 401, a communications policy is determined, for example, security, high availability, or On-demand/quality of service. As described herein, this may be determined by user profile data, obtained biometrics, etc. After determining a policy, the data/message to be transmitted over several media is split into several packets at step 403. In the next process step 404, a decision is made as to whether several different media are available according to the particular policy to be implemented. If several different media are not available, then the data packets are sent via any of the available media as depicted at step 405. If several different media are available, then the process proceeds to step 406 to determine whether there are requirements for additional robustness of data, or emergency requests, etc., e.g., according to obtained biometrics data/sensed environment, etc. If there are there requirements for additional robustness of data, or emergency requests, then the process proceeds to step 407 where packets are duplicated for transmission in all available media. If at step 406 it is determined that there are no requirements for additional robustness of data, or emergency requests, then the process proceeds to step 408 where the transmission device is implemented for sending data via the most efficient communications media format.

Figure 5:
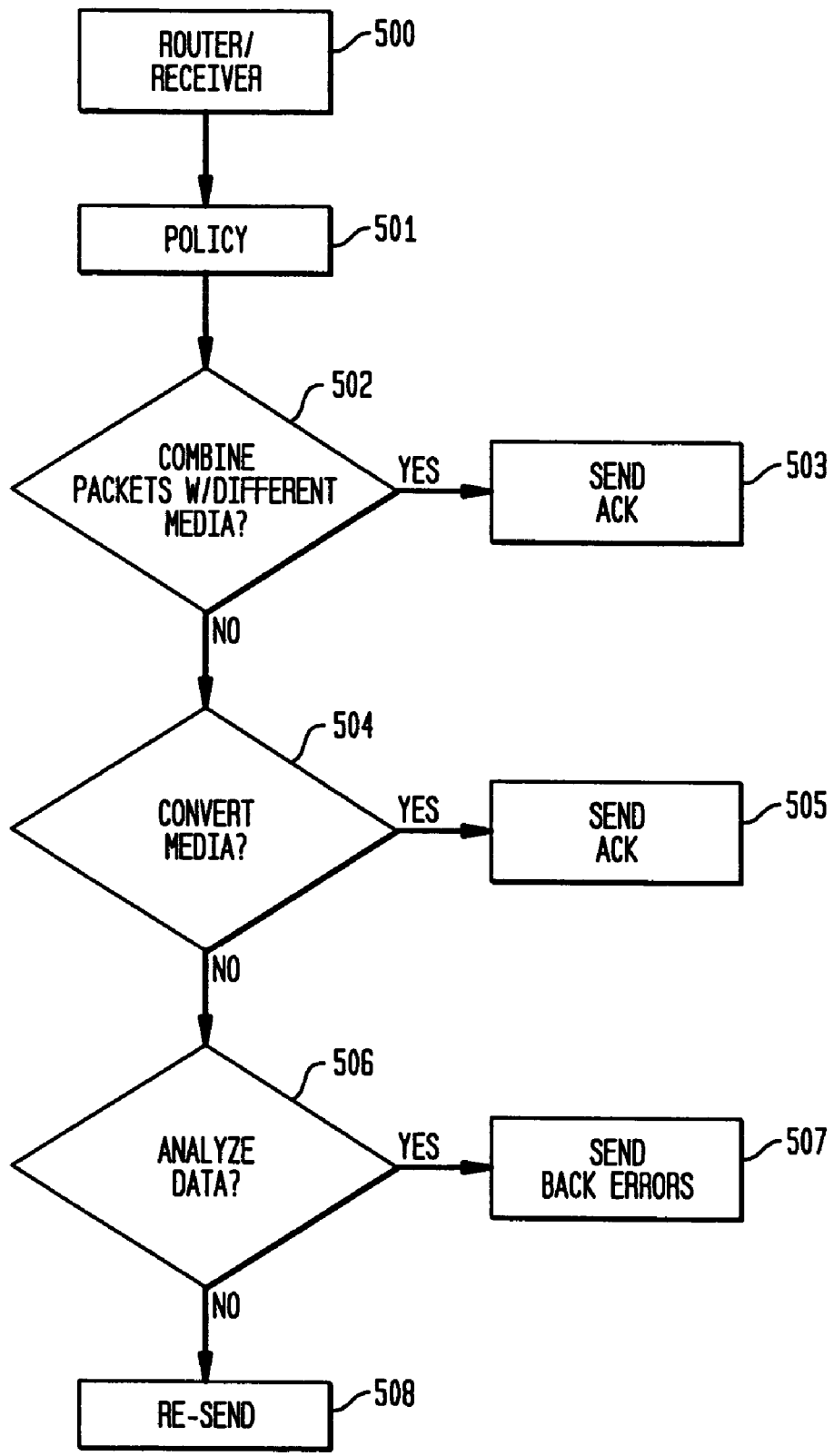

FIG. 5 depicts the methodology 500 employed at the receiver device for communicating according to the invention. As shown in a first step 501, the communications policy implemented by the transmitter is determined. This policy implemented at the receiver may have been previously communicated by the transmitter device or predetermined according to the sending devices, or may default to a particular policy, for example, based on user profile data/obtained biometrics/or environment conditions, etc. After determining a policy, a determination is made at step 502 as to whether the data/message received is to be combined by receiving packets over the different media. If the packets are received over different media and combined, then an acknowledgement message is returned back to the sender that the message has been received and combined successfully. If the packets are not to be combined but require further conversion from a first media to a different media, e.g., radio to audio, then a determination is made at step 504 to determine whether the packets are to be converted to that different media. If the media is to be converted, then an acknowledgement message is returned back to the sender that the message has been received and combined successfully. If the media is not to be converted, then a determination is made at step 506 as to whether the data is to be analyzed. If the data is analyzed, then an error message may be communicated back to the sender at step 507. Otherwise, the data is resent as indicated at step 508. Thus, FIG. 5 exemplifies the fact that the received data may optionally be analyzed and potentially converted in order to satisfy the rules of the implemented policy. The software layer that manages the policy needs to know the properties of the NA's (e.g., BER, latency, etc.) and may optionally decide to convert from one method of communication to another. Another very simple example is availability: if a message has been received via IR, but IR is not available for the next leg of communication, then it should be converted to whatever alternative communication media that is available.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A method for enabling concurrent use of multiple network access (NA) points for a single communications session comprising the steps of:

encapsulating each said multiple NA points into a single network interface, said single network interface being implemented at both a transmitter device for transmitting data and a receiver device for receiving data via at least one communications media; and, implementing a communication policy at each said single network interface to specify conversion of a message into packets and specify which of said multiple available NA points to use for every message packet via said single network interface, wherein said specified NA's enable communications over different communications media, said different communications media comprising audio, video, radio, and, infrared communications, said communication policy specifying which of said multiple NA points are implemented for reliability purposes; and, according to said communication policy implemented for reliability purposes:

transmitting data packets from said transmitter device over said specified NA's having said different communications media and, receiving at said receiver device said data packets over said specified NA's through said different media, wherein messages may be sent and received without specifying which NA point to use.

* * * * *